United States Patent
Cook et al.

(10) Patent No.: US 6,926,038 B1
(45) Date of Patent: Aug. 9, 2005

(54) HOSE STRUCTURE, FORMULATION FOR A RUBBER TUBE USED THEREIN AND METHOD OF MAKING THE HOSE STRUCTURE

(75) Inventors: James Thomas Cook, Hohenwald, TN (US); Thomas Clay Croft, Columbia, TN (US)

(73) Assignee: Eaton Corporation, Cleveland, OH (US)

( * ) Notice: Subject to any disclaimer, the term of this patent is extended or adjusted under 35 U.S.C. 154(b) by 15 days.

(21) Appl. No.: 10/029,853

(22) Filed: Dec. 31, 2001

(51) Int. Cl.⁷ .............................................. F16L 11/00
(52) U.S. Cl. ...................... 138/127; 138/126; 138/125; 138/124; 428/36.91
(58) Field of Search ............................... 138/124, 125, 138/126, 127, 141; 428/36.91

(56) References Cited

U.S. PATENT DOCUMENTS

| | | | | |
|---|---|---|---|---|
| 3,866,631 A | * | 2/1975 | Chudgar | 138/125 |
| 3,953,270 A | * | 4/1976 | Ford | 156/80 |
| 4,130,139 A | * | 12/1978 | Haren | 138/125 |
| 4,190,088 A | * | 2/1980 | Lalikos et al. | 138/126 |
| 4,196,754 A | * | 4/1980 | Payne | 138/137 |
| 4,366,746 A | * | 1/1983 | Rosecrans | 91/467 |
| 4,431,031 A | * | 2/1984 | Ettlinger | 138/109 |
| 4,585,035 A | * | 4/1986 | Piccoli | 138/127 |
| 4,806,182 A | * | 2/1989 | Rydell et al. | 156/211 |
| 5,022,459 A | | 6/1991 | Chiles et al. | |
| 5,085,905 A | * | 2/1992 | Beck | 428/35.9 |
| 5,158,113 A | * | 10/1992 | Ozawa et al. | 138/137 |
| 5,182,147 A | * | 1/1993 | Davis | 428/34.4 |
| 5,655,572 A | * | 8/1997 | Marena | 138/125 |
| 5,683,773 A | | 11/1997 | Kemper | |
| 5,957,164 A | * | 9/1999 | Campbell | 138/137 |
| 6,024,133 A | | 2/2000 | Kodama et al. | |
| 6,112,771 A | * | 9/2000 | Aoyagi et al. | 138/127 |
| 6,142,189 A | | 11/2000 | Bhattacharyya | |
| 6,179,008 B1 | * | 1/2001 | Kawazura et al. | 138/125 |
| 6,237,641 B1 | * | 5/2001 | Niki et al. | 138/126 |
| 6,302,150 B1 | * | 10/2001 | Martucci et al. | 138/125 |
| 6,397,894 B2 | * | 6/2002 | Leray et al. | 138/125 |
| 6,656,552 B1 | * | 12/2003 | Crouse | 428/36.91 |
| 2001/0001395 A1 | * | 5/2001 | Shifman et al. | 138/126 |

* cited by examiner

*Primary Examiner*—James Hook
(74) *Attorney, Agent, or Firm*—Honigman Miller Schwartz and Cohn LLP

(57) ABSTRACT

Reinforced hose, especially useful for transmitting synthetic transmission fluids and having enhanced thermal resistance includes a chlorinated polyethylene tube which is vulcanized with a blend of peroxides and cross-linking coagents to provide resistance to degradation caused by synthetic transmission oil. A plasticizer comprised of a blend of polymeric and ester based materials provides improved high temperature and low temperature properties. The tube is reinforced by a woven layer of metal wire which is in turn covered by a rubber adhesive layer that is overlain by a woven layer of yarn. The woven yarn braid is covered with a coating of polyurethane material in order to improve abrasion resistance and to prevent yarn fiber from being caught on rough surfaces that the hose may be dragged across. The entire hose is vulcanized after its assembly and then rapidly cooled. While the hose is especially suitable for transmission oil coolers, it also has use in power steering and fuel delivery systems, as well as any other systems which may be thermally stressed and which convey fluids that may cause degradation of hoses.

7 Claims, 2 Drawing Sheets

HOSE STRUCTURE, FORMULATION FOR A RUBBER TUBE USED THEREIN AND METHOD OF MAKING THE HOSE STRUCTURE

FIELD OF THE INVENTION

The present invention is directed to an improved hose structure; formulations for a rubber tube used therein, and method of making the hose structure. More particularly, the present invention is directed to a rubber formulation utilizing chlorinated polyethylene (CPE) for making a tubular portion of a hose and to a method of making a hose using that tubular portion.

BACKGROUND OF THE INVENTION

Rubber formulations which are resistant to both relatively high temperatures and relatively low temperatures, as well as to fluids which come into contact with rubber made of the formulations are needed for oil cooler hose used with transmissions, such as but not limited to, transmissions for motor vehicles. Oil coolers are used extensively in trucks, wherein oil cooler hoses are subject to both high and low temperatures and to synthetic transmission fluids which tend to degrade the hoses.

There is also need for improvement in hoses used for fuel delivery systems, such as fuel delivery systems which convey heated diesel oil, as well as in hoses used for power steering systems. Other articles, such as gaskets and seals which utilize CPE rubber, wherein the articles are subjected to thermal stress and fluids that may degrade CPE rubber, may benefit from improvements initially directed primarily to hoses, such as transmission oil cooler hoses.

SUMMARY OF THE INVENTION

In view of the above-identified considerations, the present invention is directed to a rubber article such as a tube made of chlorinated polyethylene polymer (CPE) which has been peroxide cured and includes antioxidants and plasticizers to improve heat stability.

In a more specific aspect, the CPE polymer comprises a blend of two different plasticizers, one being polymeric based and the other being ester based, wherein the polymeric portion gives added protection to high temperatures and the ester portion provides improved low temperature properties.

In still further aspects of the invention, resistance to chemical degradation is provided by a blend of quinoline materials, while heat stabilization is provided by a blend of metal oxides and silicates.

The present invention is also directed to a hose for transmitting liquids wherein the hose comprises an inner tube made of the aforediscussed CPE which has been peroxide cured; a ply of metal wire braided directly over the inner tube, a thin layer of rubber covering the wire; a layer of polyester yarn braided over the rubber layer, and a dye containing urethane deposited over the layer of yarn.

In a further aspect of the invention, the polyethylene polymer is a vulcanized blend of peroxides and cross-linking coagents which is plasticized using a blend of polymeric and ester based plasticizers and is heat stabilized by using a blend of metal oxides and silicates.

In still a further aspect of the invention, the hose is used as transmission oil cooler hose, fuel line hose or power steering hose.

In accordance with a method for making the afore described hose, the aforedescribed rubber compound is mixed until the ingredients are in a homogeneous state, then cooled and perhaps stored. A hose tube formed of the rubber compound is extruded through an extruder at an elevated temperature and metal wiring reinforcement braided thereover. A thin layer of rubber is then applied over the wire braid and an outer textile braid is applied over the thin rubber layer. After a polyurethane layer is placed over the outer textile braid, the hose is vulcanized and cooled.

DETAILED DESCRIPTION

Figure 1:
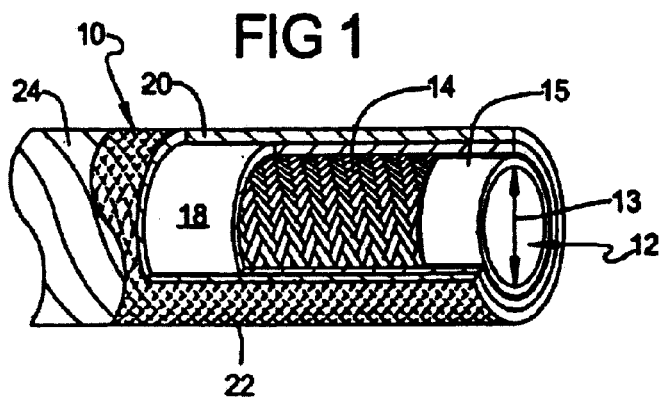
FIG. 1 is a perspective view of a hose configured in accordance with the principles of the present invention, and FIGS. 2A–2B a schematic view of steps used in the manufacturer of the hose of FIG. 1.

Referring now to FIG. 1, there is shown a hose 10 configured in accordance with the principles of the present invention. The hose 10 comprises a chlorinated polyethylene (CPE) tubular portion 12 having a desired inside diameter 13, at least one layer of braided metal wire 14 which may be of stainless steel or brass plated steel that is braided directly onto the outer surface 15 of the tubular portion 12 in order to reinforce the tube. Disposed over the metal reinforcing layer is a relatively thin adhesive backing layer 18, which may or may not be of the same rubber formulation as the tube 12. Over the adhesive backing layer 18 is an outer yarn braid layer 20 which is preferably polyester yarn braided directly onto the adhesive backing layer 18.

A coating 22 containing a polymeric material, preferably polyurethane, is applied over the textile yarn layer 20. The coating 22 may be black or any other color. The coating 22 provides the hose 10 with improved abrasion resistance due to its polyurethane content. Moreover, the coating 22 provides improved surface characteristics because the strands of the textile yarn layer 20 are sealed so that fiber does not hang from the hose 10 and catch on rough surfaces that the hose may be dragged over.

The present invention uses a polymer rubber formulation for the tubular portion 12 of the hose 10 which has both high and low temperature resistance and is resistant to fluids such as synthetic transmission oil. The base polymer is chlorinated polyethylene (CPE), which allows for higher temperature resistance than compounds such as acrylonitrile butadiene or polychloroprene, conventionally used for transmission oil cooler hose.

In order to allow the tubular portion 12 of the hose 10 to remain flexible after extended exposure to aggressive fluids at elevated temperatures, an antioxidant system having a blend of peroxides and cross-linking coagents are used as vulcanizing agents.

By having a blend of two different plasticizers, one being polymeric based and the other being ester based, substantial high and low temperature resistance is provided. The polymeric portion provides added protection against high heat exposures and the ester-based portion provides improved low temperature properties to prevent the hose from cracking at temperatures that would cause traditional oil transmission oil cooler hose to fail.

| Component | Description | Parts by Weight |
|---|---|---|
| Polymer | CPE | 90–100 |
| Plasticizer | Blend of polymeric and ester based component, e.g. | 35–55 |
| | (Dioctyl Adipate) | (10–30) |
| | (Epoxidized soyabean oil) | (10–30) |
| Reinforcing Agent | Carbon black | 100–150 |
| Heat Stabilizer | Magnesium Oxide, Lead Silicate | 5–20 |
| Antidegradants | 2,2,4-Trimethyl-1,2-dihydroquinoline 6-ethoxy-1,2-dihydro-2,2,4-trimethylquinoline | 0.5–3 |
| Process Aids | Stearic Acid, Polyethylene (low molecular weight) | 0.5–2 |
| Vulcanizing Agents | Blend of peroxide and cross-linking coagents, e.g. | 6–20 |
| | (Dicumyl peroxide) | (2–10) |
| | (1,1-bis(t-butylperoxy), | (2–5) |
| | (3,3,5-trimethyl cyclohexame), | (2–5) |
| | (Triallyl Trimellitate) | |

The hose 10 of the present invention may be manufactured with a range of parts by weight. In one application, the hose 10 may be 90 parts by weight of chlorinated polyethylene polymer, and have a total of 320 parts by weight. As a result, the percentage, by weight, of chlorinated polyethylene polymer is approximately 28%.

The resulting rubber compound is mixed using an internal mixer as a temperature which rises from room temperature to about 250° F. and is held at the 250° F. level for about one minute. In the mixer, the ingredients are sheared until they reach a homogeneous state. The mixed ingredients are then dumped from the mixer, quickly cooled and stored for making the hose 10.

After applying the coating 22, the hose 10 is optionally wrapped with a nylon strip 24 to smooth the surface of the hose even further.

Figure 2A:
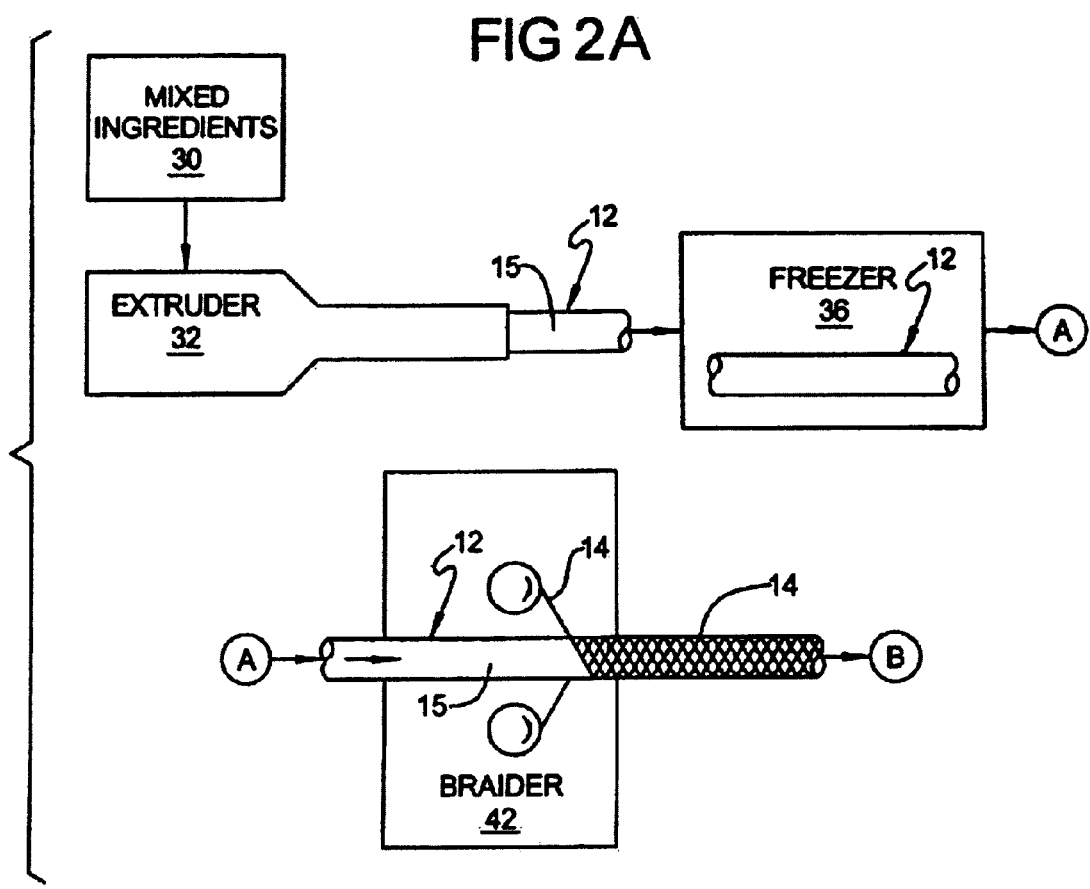
Figure 2B:
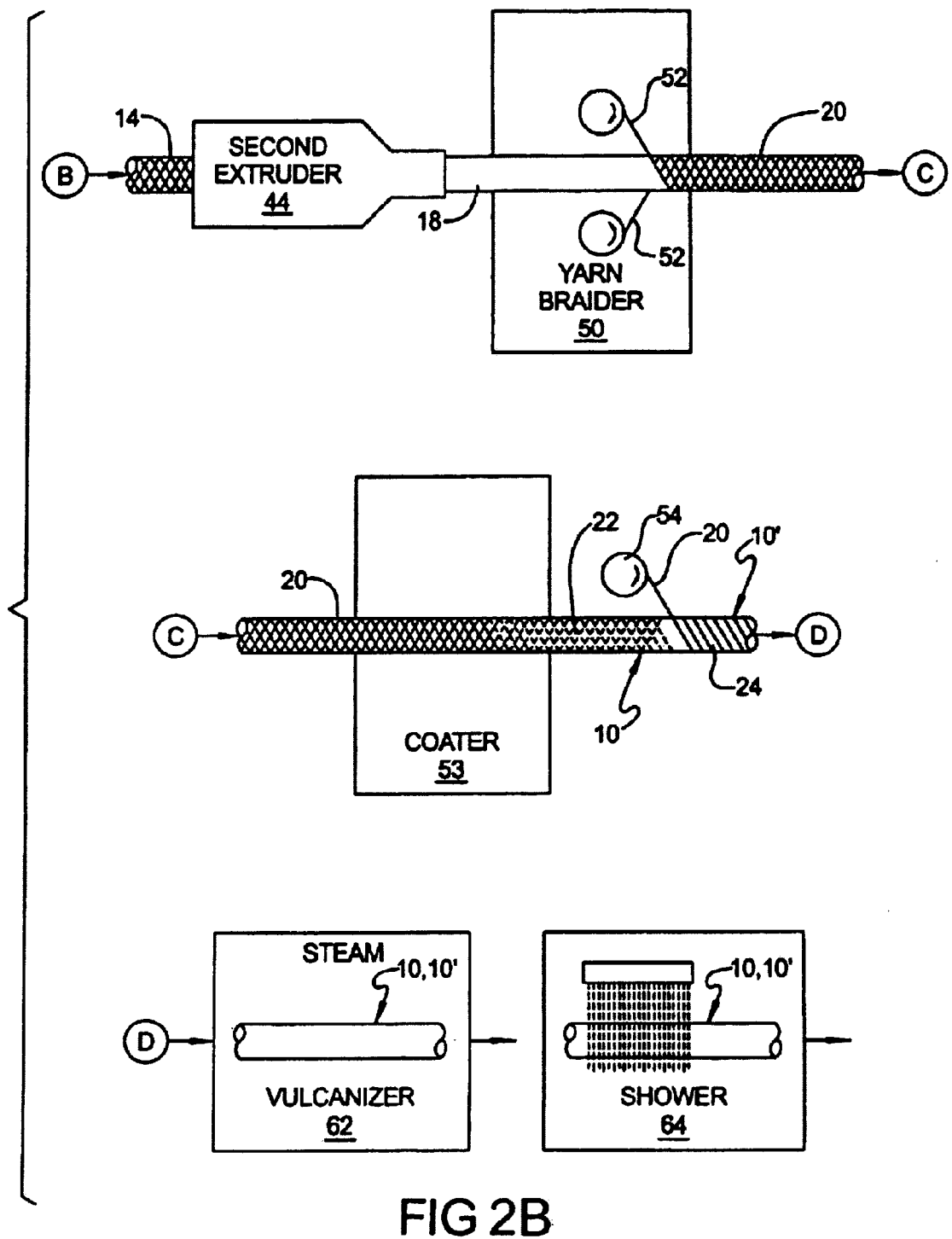

Referring now to FIGS. 2A–2B where the method of making the hose is illustrated, the mixed ingredients 30 fill an extruder 32 and are extruded onto a thermal plastic mandrel, e.g. NYLON® that forms the desired inside diameter 13. The distance between the inside diameter 13 and the outside surface 15 provides the wall thickness of the finished tube 12. The extruder 32 has an output speed of 15 to 50 feet per minute and a temperature which is maintained in the range of 150–180° F. After being extruded, the tube 12 is passed through a freezer 36 that gives dimensional stability to the tube prior to the wire reinforcement 14 being applied by a braider 42. Preferably, the braiding wire 14 is either stainless steel wire or brass plated steel wire. The tube 12 with the reinforcing layer 14 thereover is then passed through a rubber strip unwind unit which lays the adhesive backing layer 18 over the wire reinforcing layer 14. The backing layer 18 is preferable of rubber and provides an adhesive layer between the wire layer 14 and the subsequent layer of yarn braid 20. The yarn braid 20 is applied by a yarn braider 50 which dispenses strands 52 of yarn. Subsequent to the strands 52 of yarn forming the yarn braided layer 20, the coating 22 having a polyurethane base is applied by a coater 53 over the braided yarn layer 20.

In accordance with one embodiment of the invention, the nylon strip 24 is wrapped by a wrapper. 54 around the hose 10 to produce a hose 10' prior to vulcanization in order to smooth the surface of the hose further. If this is not deemed necessary, the nylon strip 24 is not utilized.

The hose 10 or 10' is then vulcanized by a vulcanizer 62 in steam, at approximately 300° F. for a period in the range of 60–120 minutes. Thereafter, the hose 10 is placed in a water shower 64.

By the aforementioned process, a hose 10 is produced which is particularly useful as transmission oil cooler hose that withstands both high and low temperatures as well as resistance to degradation by synthetic transmission oil. Since the hose 10 has enhance heat resistance and can withstand temperatures in excess of 300° F., it is useful in power steering systems and for fuel return lines in fuel delivery systems which handle heated diesel fuel.

From the foregoing description, one skilled in the art can easily ascertain the essential characteristics of this invention, and without departing form the spirit and scope thereof, can make various changes and modifications of the invention to adapt it to various usages and conditions.

We claim:

1. A hose for transmitting liquids, the hose comprising:

an inner tube portion made of a chlorinated polyethylene polymer having a parts by weight of approximately 90–100, a plasticizer having a parts by weight of approximately 35–55, a reinforcing agent having a parts by weight of approximately 100–150, a heat stabilizer having a parts by weight of approximately 5–20, antidegradants having a parts by weight of approximately 0.5–3, process aids having a parts by weight of approximately 0.5–2, and vulcanizing agents having a parts by weight of approximately 6–20;

a ply of metal wire braided directly over the inner tubular portion;

a thin rubber layer covering the wire;

a layer of polyester yarn braided over the thin rubber layer; and a dye containing urethane deposited over and into the layer of yarn.

2. The hose of claim 1 wherein the plasticizer includes a blend of polymeric and ester based components.

3. The hose of claim 1 wherein the heat stabilizer includes a blend of metal oxides and silicates.

4. The hose of claim 1 wherein the vulcanizing agents include peroxide and cross-linking agents which effect the peroxide cure.

5. The hose of claim 1 wherein the thin rubber layer is comprised of the same formulation as the tubular portion.

6. The hose of claim 5 wherein the ply of metal wire is comprised of stainless steel or brass coated steel wire.

7. The hose of claim 1 wherein the ply of metal wire is comprised of stainless steel or brass coated steel wire.

* * * * *